United States Patent  [19] Patent No.: US 7,402,059 B2
Ciocci et al.  [45] Date of Patent: Jul. 22, 2008

(54) CONNECTION-CONTINUITY-CONTROLLED SYSTEM FOR FLUIDTIGHT CONNECTION OF TWO PIPES

(75) Inventors: Fabrizio Ciocci, Modena (IT); Franco Rossi, Montale Rangone (IT); Luca Poggio, Casalecchio di Reno (IT)

(73) Assignee: Ferrari S.p.A., Modena (IT)

( * ) Notice: Subject to any disclaimer, the term of this patent is extended or adjusted under 35 U.S.C. 154(b) by 214 days.

(21) Appl. No.: 11/318,051

(22) Filed: Dec. 23, 2005

(65) Prior Publication Data

US 2006/0216979 A1 Sep. 28, 2006

Related U.S. Application Data

(63) Continuation-in-part of application No. PCT/EP2004/051186, filed on Jun. 21, 2004.

(30) Foreign Application Priority Data

Jun. 23, 2003 (IT) .............................. BO03A0387

(51) Int. Cl.
*H01R 4/60* (2006.01)
*H01R 4/64* (2006.01)

(52) U.S. Cl. ........................ 439/191; 439/194

(58) Field of Classification Search ................. 439/191, 439/190, 194, 192, 197
See application file for complete search history.

(56) References Cited

U.S. PATENT DOCUMENTS

| 4,840,574 | A | * | 6/1989 | Mills | ........................... 439/191 |
| 5,607,315 | A | * | 3/1997 | Bonnah et al. | .............. 439/130 |
| 6,532,931 | B1 | | 3/2003 | Hamada et al. | |
| 2002/0016102 | A1 | | 2/2002 | Saba | |
| 2002/0058436 | A1 | | 5/2002 | Saba | |

FOREIGN PATENT DOCUMENTS

EP  0 564 701 A1  10/1993

OTHER PUBLICATIONS

International Search Report for PCT/EP2004/051186 dated Sep. 9, 2004.

* cited by examiner

*Primary Examiner*—Hae Moon Hyeon
(74) *Attorney, Agent, or Firm*—Marcus S. Simon; Graybeal Jackson Haley

(57) ABSTRACT

A connection system for fluidtight connection of a first and a second pipe; the connection system includes a connecting device for establishing a fluidtight connection between the first and second pipe, and which has a fixed electric connector, a movable electric connector which is independent of the second pipe and connectable to the fixed electric connector, a control device for determining electrical connection of the fixed electric connector and the movable electric connector, and an interlocking device which only permits connection of the fixed electric connector and the movable electric connector in the presence of a connection between the first and second pipe.

19 Claims, 6 Drawing Sheets

US 7,402,059 B2

CONNECTION-CONTINUITY-CONTROLLED SYSTEM FOR FLUIDTIGHT CONNECTION OF TWO PIPES

PRIORITY CLAIM

This is a continuation-in-part application which claims priority from PCT/EP2004/051186, published in English, filed Jun. 21, 2004, which claims priority from Italian patent Application No. BO2003A 000387, filed Jun. 23, 2003, which are incorporated herein by reference.

TECHNICAL FIELD

The present invention relates to a connection-continuity-controlled system for fluidtight connection of two pipes.

The present invention may be used to advantage for connecting two pipes of an automotive internal combustion engine, to which the following description refers purely by way of example.

BACKGROUND

When running, an automotive internal combustion engine normally produces vapour (or so-called "blowby gas") in the cylinder heads and/or oil tank. Since air pollution regulations prohibit exhaust of such vapour into the atmosphere, and require that it be fed into the cylinders for controlled combustion, internal combustion engines are equipped with a recirculating circuit comprising a feed pipe fitted to the cylinder head or oil tank and connected to an intake pipe of the engine.

During routine servicing of the engine, the feed pipe may be disconnected from the intake pipe and/or cylinder head for cleaning or replacement, or simply to permit easy access to other parts of the engine, and, once disconnected from the intake pipe and/or cylinder head, may be reconnected poorly due to carelessness on the part of the fitter. Since such a situation easily goes undetected, by the vapour being released directly into the atmosphere and in no way impairing operation of the engine, more recent air pollution regulations require correct connection control of the feed pipe, and that the driver be alerted of any faulty connection.

One solution to determine correct connection of the feed pipe is described in Patent U.S. Pat. No. 6,532,931-B1, in which the feed pipe is provided on the ends with connecting devices, each of which comprises a pneumatic connector for pneumatically connecting the feed pipe to the intake pipe or cylinder head; and an electric connector. Each connecting device is designed so that the relative pneumatic connector is only connected to a corresponding pneumatic connector on the intake pipe or cylinder head when the relative electric connector is connected to a corresponding electric connector on the intake pipe or cylinder head. Consequently, correct connection of the pneumatic connectors, and therefore of the feed pipe, can be determined by determining the electric continuity of the circuit formed by connection of the electric connectors.

The connection system described in Patent U.S. Pat. No. 6,532,931-B1, however, has several drawbacks by employing connecting devices comprising a pneumatic connector and an electric connector in the same structure, which makes thorough cleaning of the pneumatic connector problematic. Moreover, any change in the diameter of the pneumatic connector involves high-cost alteration of the connecting device as a whole.

SUMMARY

It is an object of the present invention to provide a system for fluidtight connection of two pipes, which is cheap and easy to produce, while at the same time eliminating the aforementioned drawbacks.

According to the present invention, there is provided a connection system for fluidtight connection of a first and a second pipe; the connection system comprises a connecting device for establishing a fluidtight connection between the first and second pipe, and which has a fixed control connector, a movable control connector which is mechanically independent of the connecting device and connectable to the fixed control connector, and a control device for determining connection of the fixed control connector and the movable control connector; the connection system being characterized in that the movable control connector is mechanically independent of the second pipe; and by comprising an interlocking device which only permits connection of the fixed control connector and the movable control connector in the presence of a fluidtight connection between the first and second pipe.

BRIEF DESCRIPTION OF THE DRAWINGS

A number of non-limiting embodiments of the present invention will be described by way of example with reference to the accompanying drawings, in which.

DETAILED DESCRIPTION

Figure 1:
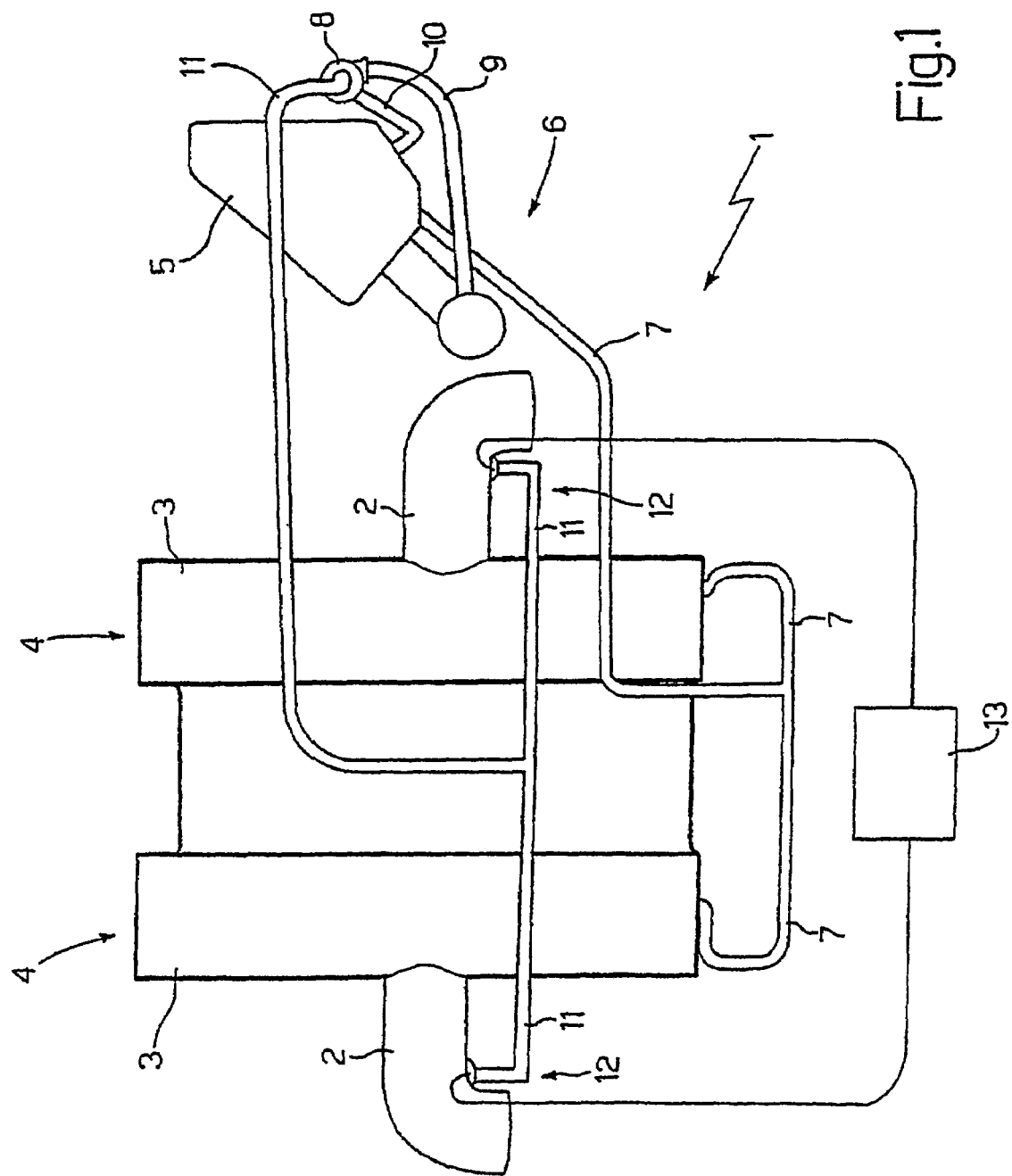
FIG. 1 shows a schematic view of an automotive internal combustion engine equipped with a recirculating circuit featuring a connection system in accordance with the present invention.

Number 1 in FIG. 1 indicates an automotive internal combustion engine comprising two sets of cylinders (not shown in detail) having respective intake pipes 2; each intake pipe 2 terminates inside a respective intake manifold 3 fixed to the top of a respective cylinder head 4; and the engine is a dry-sump engine, i.e. in which the lubricating oil tank 5 is separate from and to the side of the crankcase.

Engine 1 comprises a recirculating circuit 6 for catching the vapour formed in cylinder heads 4 and oil tank 5, and feeding the vapour into intake manifolds 3 for controlled combustion inside the cylinders. Recirculating circuit 6 comprises two catch pipes 7 connected to cylinder heads 4 to catch the vapour formed inside cylinder heads 4, and which are connected by a T fitting to terminate both inside oil tank 5; and a separating device 8 for receiving the vapour from oil tank 5 along a feed pipe 9, and separating the liquid part, i.e. oil, from the gaseous part, i.e. the vapour. From separating device 8 extend a drain pipe 10 fitted with a non-return valve (not shown in detail) to feed the oil back into oil tank 5; and a feed pipe 11 divided by a T fitting into two feed pipes 11 terminating inside intake pipes 2, close to intake manifolds 3 and downstream from the baffles (not shown in detail). Each feed pipe 11 is connected to respective intake pipe 2 by a respective connection system 12; and connection systems 12 have a common control unit 13 for determining correct connection of each feed pipe 11 to respective intake pipe 2, and for alerting the driver of any faulty connection of either feed pipe 11.

Figure 2:
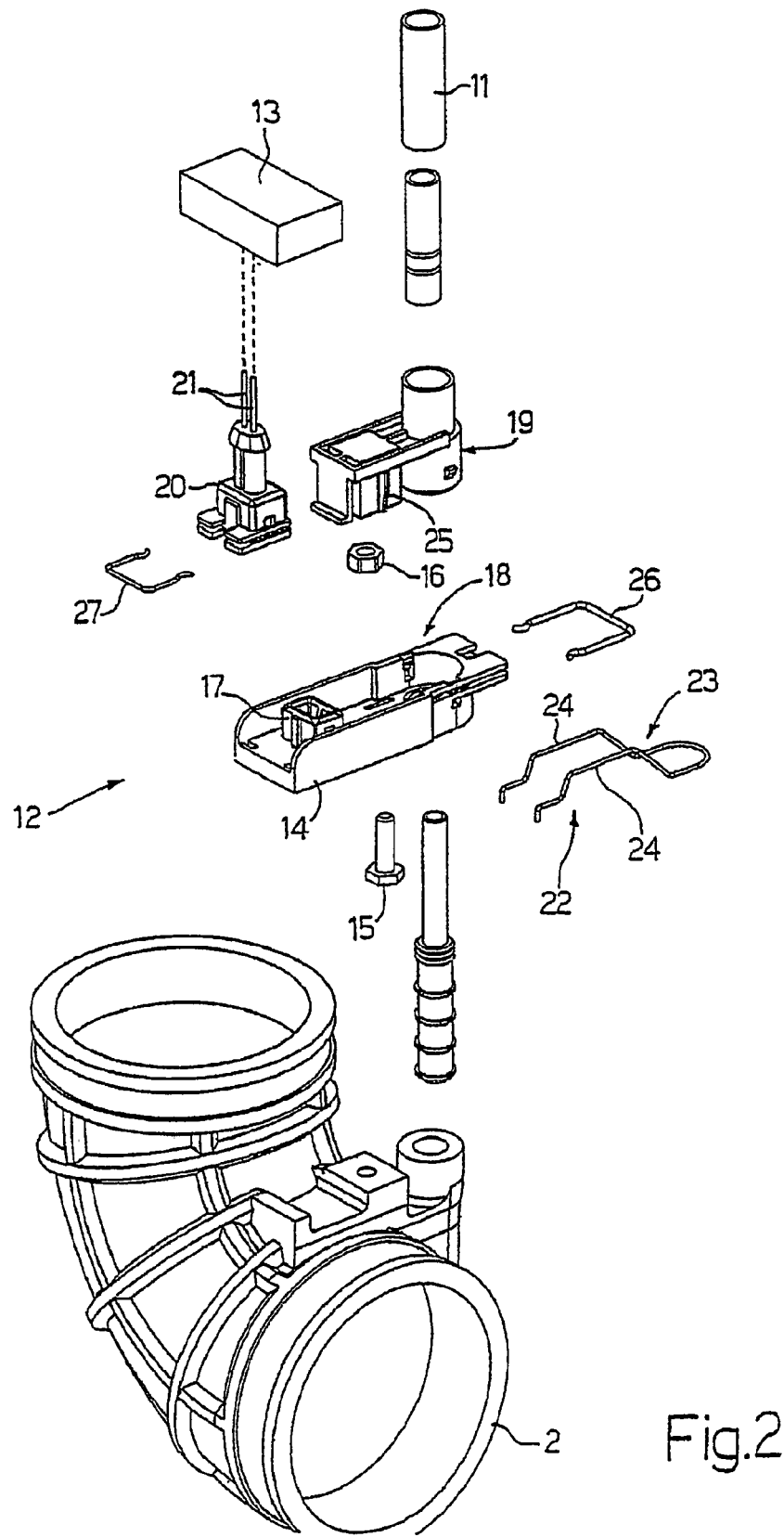
FIG. 2 shows a schematic exploded view in perspective of a FIG. 1 connection system in accordance with the present invention.
Figure 3:
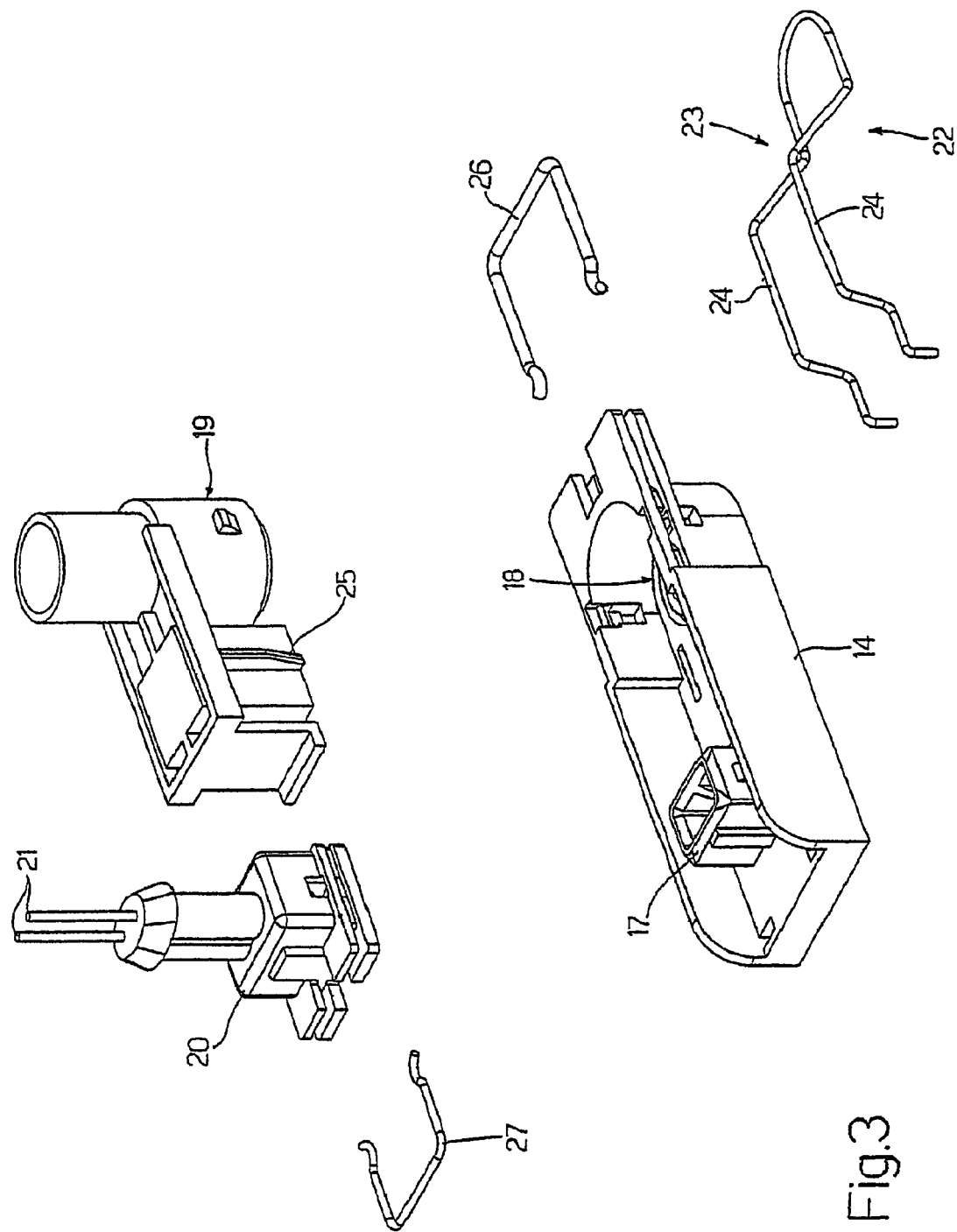
FIG. 3 shows a larger-scale view of a portion of the FIG. 2 connection system.

As shown in FIGS. 2 and 3, each connection system 12 comprises a connecting device 14 fitted integrally to respective intake pipe 2 by a screw 15 an a nut 16. Connecting device 14 comprises a fixed electric connector 17; and a seat 18 for receiving and housing a connecting body 19 formed integrally with the end of feed pipe 11 to establish a fluidtight connection between intake pipe 2 and feed pipe 11. Each connection system 12 also comprises a movable electric connector 20 which is independent of feed pipe 11, is connectable to corresponding fixed electric connector 17, and is connected electrically to control unit 13 by a bipolar electric conductor 21. Each connection system 12 also comprises an interlocking device 22 which only permits connection of fixed electric connector 17 and movable electric connector 20 when feed pipe 11 is connected properly to connecting device 14. In other words, if connecting body 19 of feed pipe 11 is not inserted properly inside seat 18 of connecting device 14, i.e. in the absence of a fluidtight connection between intake pipe 2 and feed pipe 11, interlocking device 22 prevents movable electric connector 20 from being connected to fixed electric connector 17.

Electric connectors 17 and 20 are bipolar electric connectors which, when connected, establish electric continuity between the respective conducting bodies (not shown in detail). More specifically, fixed electric connector 17 is a male electric connector, and movable electric connector 20 is a female electric connector. Fixed electric connector 17 preferably comprises a short-circuit between its two conducting bodies (not shown in detail), and control unit 13 provides for determining whether or not the conducting bodies (not shown in detail) of movable electric connector 20 are short-circuited.

When control unit 13 determines electric continuity between the two conductors of bipolar electric conductor 21, this means movable electric connector 20 is connected to fixed electric connector 17, which short-circuits the conducting bodies (not shown in detail) of movable electric connector 20. If movable electric connector 20 is connected to fixed electric connector 17, this means connecting body 19 of feed pipe 11 must be inserted properly inside seat 18 of connecting device 14, i.e. there must be a fluidtight connection between intake pipe 2 and feed pipe 11, by virtue of the presence of interlocking device 22. Control unit 13 thus provides for determining correct connection of feed pipe 11 to respective intake pipe 2.

In an alternative embodiment not shown, fixed electric connector 17 comprises a marker, and movable electric connector 20 comprises a proximity sensor for detecting the presence of the marker.

Interlocking device 22 comprises a lock member 23 for mechanically preventing connection of fixed electric connector 17 and movable electric connector 20 when feed pipe 11 is disconnected from connecting device 14. More specifically, the lock member is defined by a U-shaped metal body having two branches 24 movable between two configurations or positions.

Figure 4:
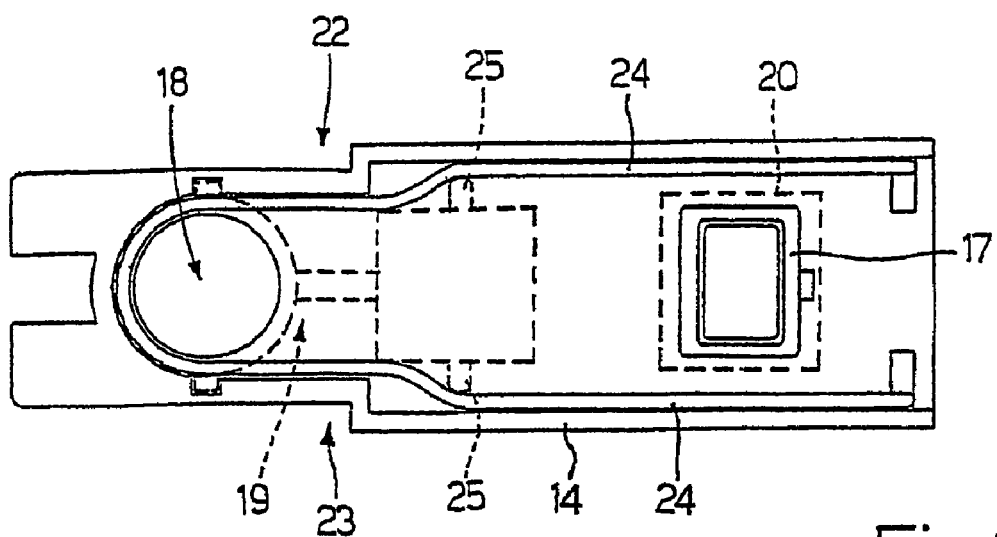
FIGS. 4 and 5 show plan views of a component part of the FIG. 2 connection system in two distinct operating configurations.
Figure 5:
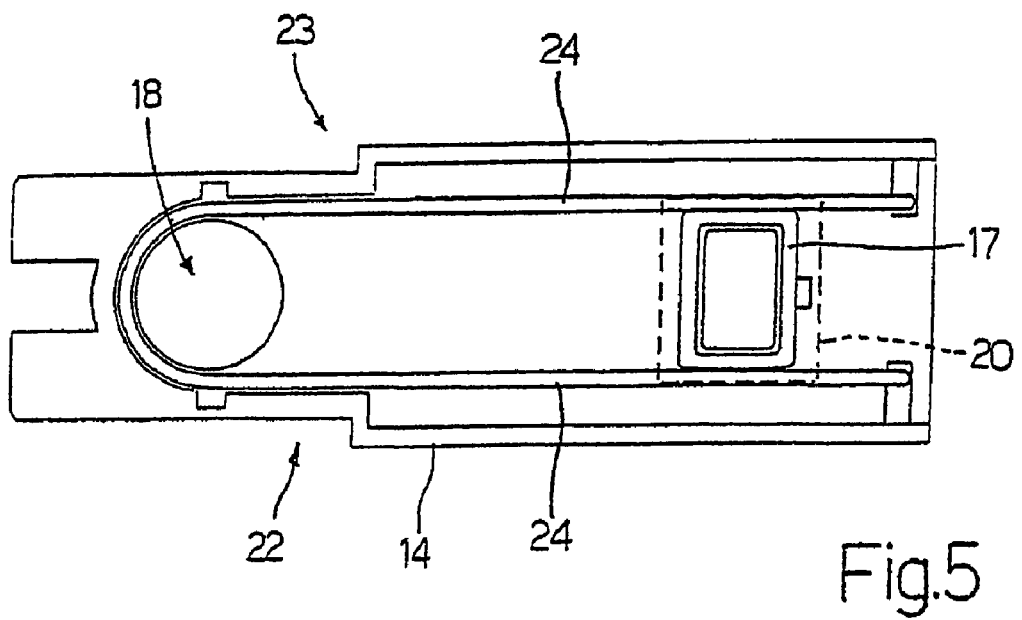

Lock member 23 may assume a first configuration or position (shown in FIG. 5) mechanically preventing connection of fixed electric connector 17 and movable electric connector 20; and a second configuration or position (shown in FIG. 4) permitting connection of fixed electric connector 17 and movable electric connector 20. Lock member 23 is moved from the first to the second configuration by connection of connecting body 19 of feed pipe 11 to connecting device 14, and in opposition to the elastic force exerted by the shape of lock member 23, which tends to keep lock member 23 in the first configuration. As shown clearly in FIG. 5, when lock member 23 is in the first configuration, the two branches 24 of lock member 23 are superimposed on fixed electric connector 17, mechanically preventing connection of movable electric connector 20 to fixed electric connector 17.

Connecting body 19 has two lateral wedges 25 for gradually exerting thrust on the two branches 24 of lock member 23 to move lock member 23 from the first to the second configuration when connecting body 19 is eased inside seat 18 of connecting device 14. Lock member 23 springs back from the second to the first configuration when connecting body 19 is removed from seat 18 of connecting device 14.

In a preferred embodiment, an elastic fastening member 26 is provided to lock connecting body 19 of feed pipe 11 to connecting device 14; and an elastic fastening member 27 is provided to lock movable electric connector 20 to connecting device 14.

In an alternative embodiment not shown, interlocking device 22 comprises an interconnecting member mechanically integral with connecting body 19 of feed pipe 11, and which is interposed between fixed electric connector 17 and movable electric connector 20 to permit connection of electric connectors 17 and 20, which cannot be connected without the interconnecting member in-between. More specifically, electric connectors 17 and 20 are preferably female electric connectors, and the interconnecting member has two electrically connected male electric connectors.

Figure 6:
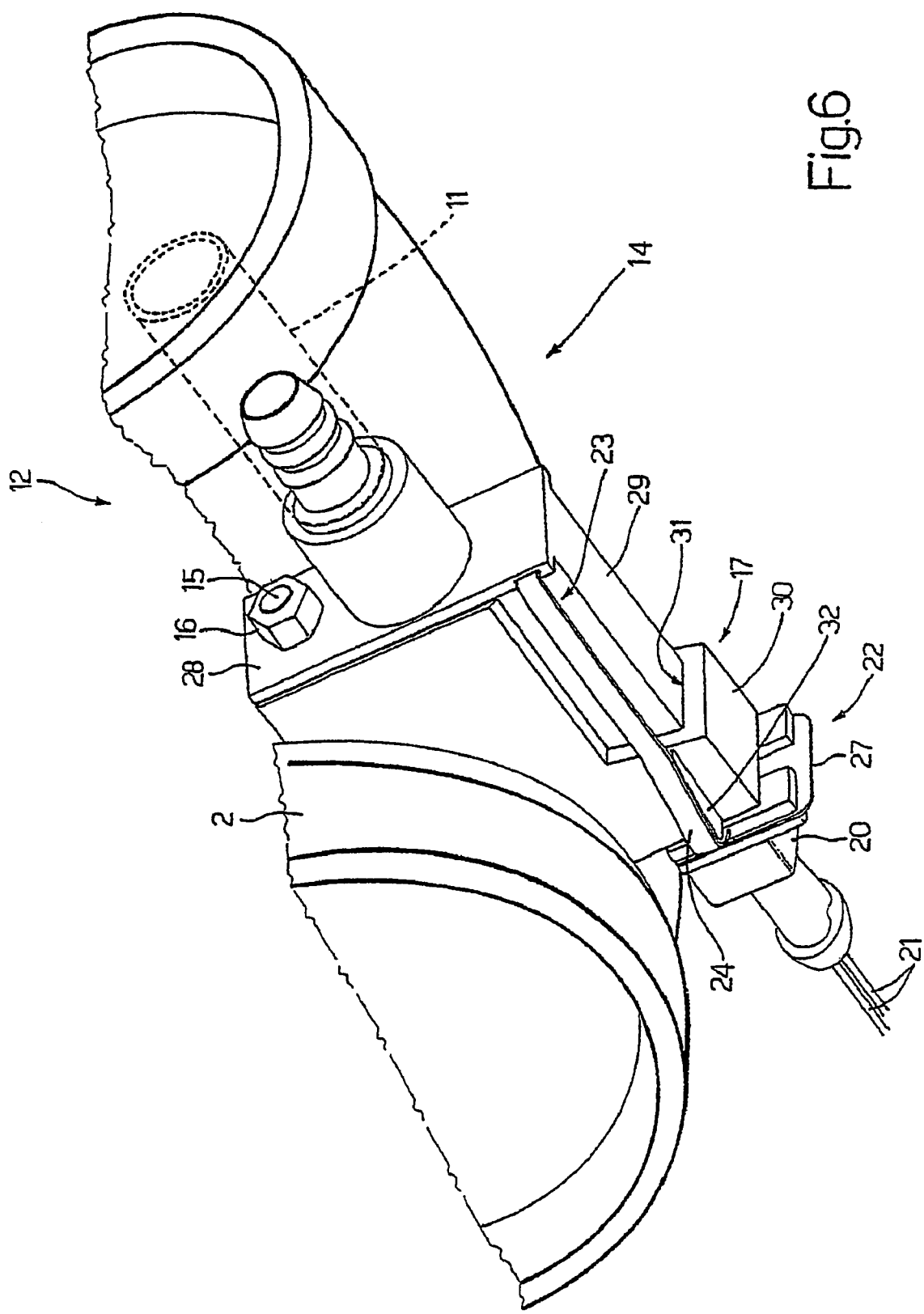
FIG. 6 shows a schematic view in perspective of a further embodiment of a FIG. 1 connection system.

As shown in the alternative embodiment in FIG. 6, connecting device 14 of connection system 12 is integral with feed pipe 11 and, in particular, is formed integrally and inseparably with feed pipe 11. Moreover, connecting device 14 is connectable to respective intake pipe 2 to establish a fluidtight connection between intake pipe 2 and feed pipe 11; and interlocking device 22 only permits connection of fixed electric connector 17 and movable electric connector 20 when connecting device 14 is connected properly to respective intake pipe 2.

Connecting device 14 is L-shaped, and comprises an arm 28 designed to permit fluidtight connection of intake pipe 2 and feed pipe 11; and an arm 29 supporting fixed electric connector 17 and interlocking device 22. An annular body 30 is provided on intake pipe 2, and has a central through hole 31 defining a seat for receiving arm 29 of connecting device 14 when connecting device 14 is connected to intake pipe 2.

Interlocking device 22 comprises a lock member 23 for mechanically preventing connection of fixed electric connector 17 and movable electric connector 20 when connecting device 14 is disconnected from intake pipe 2. More specifically, lock member 23 is defined by a U-shaped metal body having two branches 24 (only one shown in FIG. 6) movable between two configurations or positions.

Lock member 23 may assume a first configuration or position (not shown in FIG. 6) mechanically preventing connection of fixed electric connector 17 and movable electric connector 20; and a second configuration or position (shown in FIG. 6) permitting connection of fixed electric connector 17 and movable electric connector 20. Lock member 23 is moved from the first to the second configuration by insertion of connecting device 14 inside hole 31 of annular body 30, and in opposition to the elastic force exerted by the shape of lock member 23, which tends to keep lock member 23 in the first configuration. When lock member 23 is in the first configuration, the two branches 24 of lock member 23 are superimposed on fixed electric connector 17, mechanically preventing connection of movable electric connector 20 to fixed electric connector 17.

Annular body 30 has two lateral wedges 32 (only one shown in FIG. 6) for gradually exerting thrust on the two branches 24 of lock member 23 to move lock member 23 from the first to the second configuration as arm 29 of connecting device 14 is gradually inserted through hole 31 of annular body 30. Lock member 23 springs back from the second to the first configuration when arm 29 of connecting device 14 is removed from hole 31.

Figure 7:
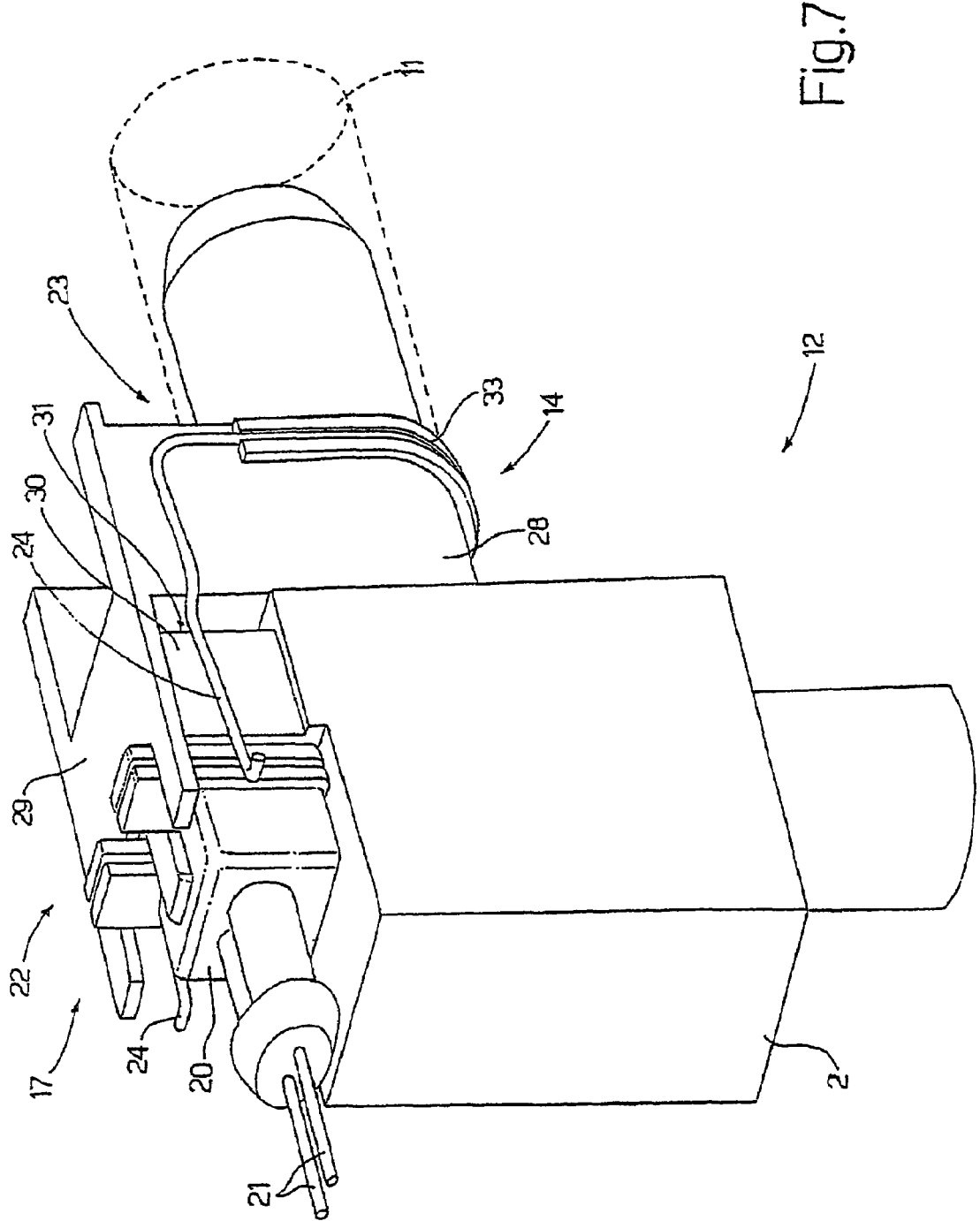
FIG. 7 shows a schematic view in perspective of a further embodiment of a FIG. 1 connection system.

FIG. 7 shows a further embodiment of connection system 12, in which connecting device 14 of connection system 12 is integral with feed pipe 11 and, in particular, is formed integrally and inseparably with feed pipe 11. Moreover, connecting device 14 is connectable to respective intake pipe 2 to establish a fluidtight connection between intake pipe 2 and feed pipe 11; and interlocking device 22 only permits connection of fixed electric connector 17 and movable electric connector 20 when connecting device 14 is connected properly to respective intake pipe 2.

Connecting device 14 is L-shaped, and comprises an arm 28 designed to permit fluidtight connection of intake pipe 2 and feed pipe 11; and an arm 29 supporting fixed electric connector 17 and interlocking device 22. An annular body 30 is provided on intake pipe 2, and has a central through hole 31 defining a seat for receiving arm 29 of connecting device 14 when connecting device 14 is connected to intake pipe 2.

Interlocking device 22 comprises a lock member 23 for mechanically preventing connection of fixed electric connector 17 and movable electric connector 20 when connecting device 14 is disconnected from intake pipe 2. More specifically, lock member 23 is defined by a U-shaped metal body bent into an L and having two branches 24 movable between two configurations or positions. More specifically, a central portion of lock member 23 is inserted inside a respective seat 33 formed in connecting device 14.

Lock member 23 may assume a first configuration or position (not shown in FIG. 7) mechanically preventing connection of fixed electric connector 17 and movable electric connector 20; and a second configuration or position (shown in FIG. 7) permitting connection of fixed electric connector 17 and movable electric connector 20. Lock member 23 is moved from the first to the second configuration by insertion of connecting device 14 inside hole 31 of annular body 30, and in opposition to the elastic force exerted by the shape of lock member 23, which tends to keep lock member 23 in the first configuration. When lock member 23 is in the first configuration, the two branches 24 of lock member 23 are superimposed over fixed electric connector 17, mechanically preventing connection of movable electric connector 20 to fixed electric connector 17.

As arm 29 of connecting device 14 is inserted gradually through hole 31 of annular body 30, annular body 30 gradually exerts thrust on the two branches 24 of lock member 23 to move lock member 23 from the first to the second configuration. Lock member 23 springs back from the second to the first configuration when arm 29 of connecting device 14 is removed from hole 31.

In an alternative embodiment not shown, lock member 23 is designed to be housed inside hole 31 of annular body 30 when arm 29 of connecting device 14 is inserted through hole 31; and annular body 30 is designed internally so that, as arm 29 of connecting device 14 is inserted gradually through hole 31 of annular body 30, annular body 30 gradually exerts thrust on the two branches 24 of lock member 23 to move lock member 23 from the first to the second configuration.

Connection system 12 as described above may obviously be used for connecting any two pipes in an internal combustion engine, and also for other applications requiring connection continuity control.

Connection system 12 as described above is cheap and easy to produce, keeps the electric part, i.e. movable electric connector 20, separate from the pneumatic part, i.e. feed pipe 11, and permits size change of feed pipe 11 by simply replacing relative connecting device 14.

From the foregoing it will be appreciated that, although specific embodiments of the invention have been described herein for purposes of illustration, various modifications may be made without deviating from the spirit and scope of the invention.

The invention claimed is:

1. A connection system for fluidtight connection of a first and a second pipe; the connection system comprises:
   a connecting device for establishing a fluidtight connection between the first and second pipe, and which has a fixed control connector;
   a movable control connector which is mechanically independent of the connecting device and the second pipe, and connectable to the fixed control connector; and
   a control device for determining connection of the fixed control connector and the movable control connector; and
   an interlocking device which only permits connection of the fixed control connector and the movable control connector in the presence of a fluidtight connection between the first and second pipe.

2. The connection system as claimed in claim 1, wherein the fixed control connector and the movable control connector are bipolar electric connectors which, when connected mutually, establish electric continuity between the respective conducting bodies.

3. The connection system as claimed in claim 2, wherein the fixed control connector is a male electric connector, and the movable control connector is a female electric connector.

4. The connection system as claimed in claim 1, wherein the connecting device is integral with the first pipe, and receives the second pipe to establish a fluidtight connection between the first and the second pipe; the interlocking device only permitting connection of the fixed control connector and the movable control connector when the second pipe is connected properly to the connecting device.

5. The connection system as claimed in claim 4, wherein the interlocking device comprises a lock member for mechanically preventing connection of the fixed control connector and the movable control connector when the second pipe is disconnected from the connecting device.

6. The connection system as claimed in claim 5, wherein the lock member is moved between a first position, mechanically preventing connection of the fixed control connector and the movable control connector, and a second position, permitting connection of the fixed control connector and the movable control connector, by connection of the second pipe to the connecting device and in opposition to elastic means which tend to keep the lock member in the first position.

7. The connection system as claimed in claim 6, wherein the lock member is defined by a U-shaped metal body having two branches which are superimposed on the fixed control connector when the lock member is in the first position.

8. The connection system as claimed in claim 7, wherein the second pipe has a connecting body which fits in fluidtight manner to the connecting device and is inserted between the two branches of the lock member, thus parting the two branches.

9. The connection system as claimed in claim 8, and comprising an elastic fastening means for locking the connecting body of the second pipe to the connecting device.

10. The connection system as claimed in claim 1, wherein the connecting device is integral with the second pipe and is connected to the first pipe to establish a fluidtight connection between the first and second pipe; the interlocking device only permitting connection of the fixed control connector and the movable control connector when the connecting device is connected properly to the first pipe.

11. The connection system as claimed in claim 10, wherein the interlocking device comprises a lock member for mechanically preventing connection of the fixed control connector and the movable control connector when the connecting device is disconnected from the first pipe.

12. The connection system as claimed in claim 11, wherein the lock member is moved between a first position, mechanically preventing connection of the fixed control connector and the movable control connector, and a second position, permitting connection of the fixed control connector and the movable control connector, by connection of the connecting device to the first pipe and in opposition to elastic means which tend to keep the lock member in the first position.

13. The connection system as claimed in claim 12, wherein the lock member is defined by a U-shaped metal body having two branches which are superimposed on the fixed control connector when the lock member is in the first position.

14. The connection system as claimed in claim 13, wherein the lock member is defined by a U-shaped metal body bent into an L.

15. The connection system as claimed in claim 14, wherein a central portion of the lock member is inserted inside a respective seat formed in the connecting device.

16. The connection system as claimed in claim 13, wherein the connecting device is L-shaped, and comprises a first arm designed to permit fluidtight connection of the first and second pipe; and a second arm supporting the fixed control connector and the lock member; a seat, which is integral with the first pipe and receives the second arm of the connecting device when the connecting device is connected to the first pipe.

17. The connection system as claimed in claim 16, wherein an annular body is provided on the first pipe, and receives the second arm of the connecting device.

18. The connection system as claimed in claim 17, wherein the annular body has at least one wedge for gradually parting the two branches of the lock member when the connecting device is connected to the first pipe.

19. The connection system as claimed in claim 1, and comprising an elastic fastening means for locking the movable control connector to the connecting device.

* * * * *